(12) United States Patent
Lake et al.

(10) Patent No.: US 8,393,386 B2
(45) Date of Patent: *Mar. 12, 2013

(54) SUBSURFACE SAFETY VALVE AND METHOD OF ACTUATION

(75) Inventors: Gary B. Lake, Houston, TX (US); John E. Burris, Sapulpa, OK (US); David Z. Anderson, Tulsa, TX (US); Brock A. Peoples, Sapulpa, OK (US); Robert G. McDaniel, Broken Arrow, OK (US); Charles M. Tompkins, Tulsa, OK (US); Grant R. Thompson, Tulsa, OK (US)

(73) Assignee: Baker Hughes Incorporated, Houston, TX (US)

( * ) Notice: Subject to any disclaimer, the term of this patent is extended or adjusted under 35 U.S.C. 154(b) by 328 days.

This patent is subject to a terminal disclaimer.

(21) Appl. No.: 12/623,988

(22) Filed: Nov. 23, 2009

(65) Prior Publication Data

US 2011/0120727 A1 May 26, 2011

(51) Int. Cl.
*E21B 31/06* (2006.01)
(52) U.S. Cl. ....... 166/66.5; 166/66.7; 166/386; 166/373
(58) Field of Classification Search .................. 166/375, 166/66.7, 66.5, 386, 373
See application file for complete search history.

(56) References Cited

U.S. PATENT DOCUMENTS

| | | | |
|---|---|---|---|
| 2,785,755 A | 3/1957 | En Dean | |
| 4,687,054 A | 8/1987 | Russell et al. | |
| 5,252,043 A | 10/1993 | Bolding et al. | |
| 5,409,356 A | 4/1995 | Massie | |
| 5,620,048 A | 4/1997 | Beauquin | |
| 5,734,209 A | 3/1998 | Hallidy | |
| 5,831,353 A | 11/1998 | Bolding et al. | |
| 5,917,774 A | 6/1999 | Walkow et al. | |
| 5,959,374 A | 9/1999 | Anderson et al. | |
| 5,960,875 A | 10/1999 | Beauquin et al. | |
| 6,039,014 A | 3/2000 | Hoppie | |
| 6,619,388 B2 | 9/2003 | Dietz et al. | |
| 6,926,504 B2 | 8/2005 | Howard | |
| 6,988,556 B2 | 1/2006 | Vick, Jr. | |
| 7,145,271 B2 | 12/2006 | Thirunarayan et al. | |
| 7,213,653 B2 | 5/2007 | Vick, Jr. | |
| 7,316,270 B2 | 1/2008 | Shen | |
| 7,370,709 B2 * | 5/2008 | Williamson, Jr. ............. | 166/386 |
| 7,373,971 B2 | 5/2008 | Montgomery | |
| 7,434,626 B2 | 10/2008 | Vick | |
| 8,267,167 B2 * | 9/2012 | Lake et al. ................... | 166/66.5 |
| 2001/0026204 A1 | 10/2001 | Petro | |
| 2005/0087335 A1 | 4/2005 | Vick, Jr. | |

(Continued)

OTHER PUBLICATIONS

Garner, et al. "At the Ready: Subsurface Safety Valves". Oilfield Review. pp. 52-64. Winter 2002/2003.

(Continued)

*Primary Examiner* — Kenneth L Thompson
*Assistant Examiner* — Yong-Suk (Philip) Ro
(74) *Attorney, Agent, or Firm* — Cantor Colburn LLP

(57) ABSTRACT

A downhole valve apparatus including a force transmitter configured to move in an axial direction and a valve actuator configured to move in an axial direction. The valve actuator is independently movable relative to the force transmitter and physically isolated from the force transmitter. A first magnetic assembly is disposed at the force transmitter. A second magnetic assembly is disposed at the valve actuator. The first and second magnetic assemblies are configured to repel one another and cause the force transmitter to move the valve actuator when the force transmitter is moved toward the valve actuator.

20 Claims, 2 Drawing Sheets

U.S. PATENT DOCUMENTS

| | | | |
|---|---|---|---|
| 2007/0289734 | A1 | 12/2007 | McDonald et al. |
| 2007/0295515 | A1 | 12/2007 | Veneruso et al. |
| 2008/0053662 | A1* | 3/2008 | Williamson et al. .......... 166/381 |
| 2008/0110611 | A1 | 5/2008 | Bane et al. |
| 2009/0250206 | A1 | 10/2009 | Lake et al. |
| 2009/0277687 | A1 | 11/2009 | Lee |
| 2010/0025045 | A1* | 2/2010 | Lake et al. .................... 166/373 |
| 2011/0120728 | A1* | 5/2011 | Lake et al. .................... 166/375 |

OTHER PUBLICATIONS

International Search Report and Written Opinion, Mailed Jun. 17, 2011, International Appln. No. PCT/US2010/056700, Written Opinion 3 Pages, International Search Report 3 Pages.

International Search Report and Written Opinion, Mailed Jun. 15, 2011, International Appln. No. PCT/US2010/056215, Written Opinion 2 Pages, International Search Report 3 Pages.

Dexter Magnetic Technologies, Inc., "MagneGear Linear Magnetic Gear—Magnetically Geared and Sprung Safety Valve", www.dextermag.com, pp. 1-2.

International Search Report and Written Opinion, Mailed Apr. 22, 2010, International Appln. No. PCT/US2010/044858, Written Opinion 4 Pages, International Search Report 3 Pages.

Timothy Price, William McDonald, Gareth Hatch, "The MagneGear Efficient rotary and Linear Magnetic Gearing Devices for Downhole Applications", Technical Paper, Dexter Magnetic Technologies, Inc., Apr. 2007, pp. 1-4.

* cited by examiner

SUBSURFACE SAFETY VALVE AND METHOD OF ACTUATION

BACKGROUND

Surface controlled subsurface safety valves (SCSSV) are often utilized in boreholes in the drilling and completion industries such as carbon dioxide sequestration and hydrocarbon production, evaluation and exploration operations. Such valves are typically located downhole and are closable upon, for example, detection of a pressure imbalance or operational imbalance in the borehole. Subsurface safety valves are generally actuated using hydraulic fluid supplied from a surface facility. Oilfield operators encounter technical challenges when trying to operate subsurface safety valves at great depths. Accordingly, electrically actuated safety valves are a potential solution for valves located at significant borehole depths. One challenge of electric motors and devices is that they generally must be operated in fairly benign conditions. Downhole conditions are some of the most environmentally challenging conditions on the planet. Thus, electrically actuated SCSSVs generally require that the electric actuator be isolated from borehole conditions with a dynamic seal or seals, which increases complexity, chance of failure and cost of the SCSSV assembly.

SUMMARY

A downhole valve apparatus includes: a force transmitter configured to move in an axial direction; a valve actuator configured to move in an axial direction, the valve actuator independently movable relative to the force transmitter and physically isolated from the force transmitter; a first magnetic assembly disposed at the force transmitter; and a second magnetic assembly disposed at the valve actuator, the first and second magnetic assemblies configured to repel one another and cause the force transmitter to move the valve actuator when the force transmitter is moved toward the valve actuator.

A method of controlling fluid flow in a downhole conduit includes: moving a force transmitter in an axial direction, the force transmitter including a first magnetic assembly; exerting a repulsive force on a second magnetic assembly disposed at a valve actuator, to cause the valve actuator to move in the axial direction, the valve actuator being independently movable relative to the force transmitter and physically isolated from the force transmitter; and moving a valve between an open position in which downhole fluid is allowed to flow through a downhole conduit and a closed position in which the valve prevents the flow of downhole fluid through the conduit.

BRIEF DESCRIPTION OF THE DRAWINGS

Referring now to the drawings wherein like elements are numbered alike in the several Figures.

DETAILED DESCRIPTION

Figure 1:
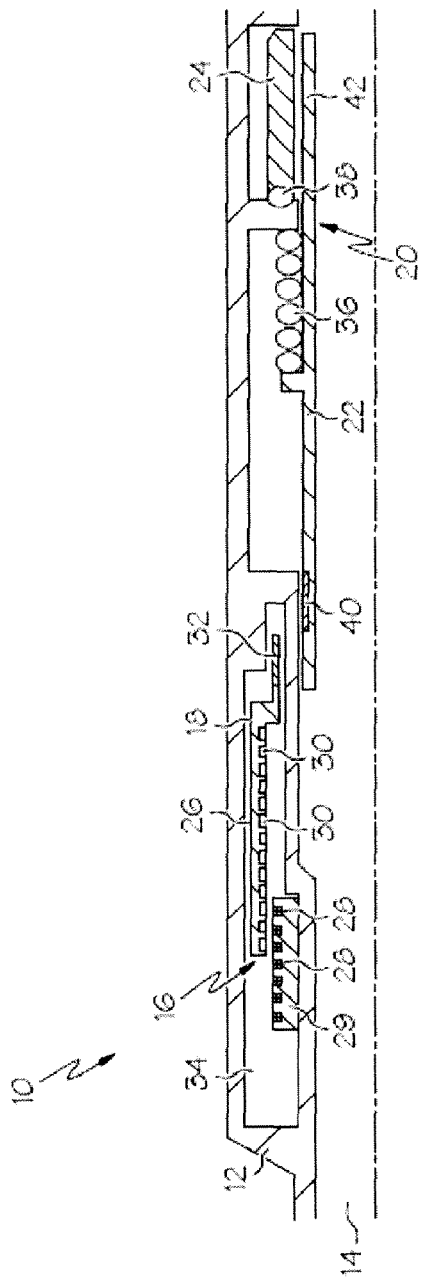
FIG. 1 is a cross-sectional view of an exemplary subsurface safety valve assembly.

Referring to FIG. 1, there is provided a subsurface valve apparatus 10, such as a safety valve configured to block or otherwise control the flow of downhole fluid through a borehole string. A non-limiting example of the valve assembly 10 is a surface controlled subsurface safety valve ("SCSSV") such as an electrically actuated SCSSV ("ESCSSV"). The valve apparatus 10 includes a control system that uses magnetic forces to transfer force and/or motion from a force transmitter to a valve actuator.

The valve apparatus 10 includes a housing 12 having a bore 14 or other downhole fluid conduit therein. For example, the bore 14 is a production bore or other bore configured to allow the passage of downhole fluid therethrough. Downhole fluid may include fluids recovered from an earth formation and/or may include drilling or production fluids introduced from the surface. An actuator assembly 16 includes a force transmitter 18, such as a piston or rod, which is movable axially relative to the housing 12. As described herein, "axial" refers to a direction at least generally parallel to a direction of the major axis of the housing 12. A valve assembly 20 includes a valve actuator 22 such as a flow tube 22 that is movable relative to a valve 24, such as a flapper valve 24, to open or close the valve 24. The configuration of the valve assembly 20 is exemplary, and may include any type of movable member 22 in operable communication with any type of valve 24 to open or close the valve 24. In addition, the valve 24 may be any suitable type of valve, such as a ball valve or a sleeve valve.

The actuator assembly 16 includes an actuation device configured to move the force transmitter, such as a motor. Exemplary actuation devices include electro-mechanical actuators, hydraulic actuators, piezoelectric actuators, electro-hydraulic actuators and others. An exemplary motor is an electrically and/or hydraulically operated linear motor.

In one example, an electric actuator assembly 16 is coupled to an electrical conductor to provide power to the actuator assembly 16 from a remote and/or surface source. The source may be a surface source supplied through a line such as a Tubing Encapsulated Conductor (TEC) line, a battery, or other downhole power generation configuration. The conductor is any suitable conductor, such as a single phase or three phase cable. A downhole controller may be included to control power to the actuator assembly 16. A downhole power source such as a battery may be disposed downhole, such as in the housing 12. The conductor may also be used to communicate between the actuator assembly 16 and surface components or users. The conductor is electrically connected to a number of coils 28 having a selected winding configuration. Each conductor may be associated with a phase and may be configured to create the coils 28. The coils 28 are mounted on a stator 29, which may take any desired shape, such as a flat elongated shape or a cylindrical shape. The force transmitter 18 includes a carrier such as a back iron 26 and a number of magnets 30 that interact with the coils 28 to move the force transmitter 18. The magnets 30 are disposed, for example, on or in the force transmitter 18.

The magnets 30 and the back iron 26 move linearly in response to the magnetic field generated by the coils 28. The specific configurations described herein is not limiting, as the linear motor may have any suitable configuration, such as a flat or tubular linear motor, or a rotational motor coupled to suitable mechanisms to translate rotational motion to linear motion. Furthermore, any number and configuration of coils 28 and magnets 30 may be used as desired, for example, to adjust the magnetic field applied to the magnets 30 and provide movement. A controller may be provided to control current through the coils to adjust the magnetic field, turn the field on and off, and reverse the magnetic field to move the back iron 26 back and forth.

The magnets 30 may be arranged as annular structures, which may be full annular structures or may be broken annular configurations using an array of individual magnets. The number of magnets is affected by one or more considerations, such as the total stroke required, coil groove thickness/depth, wire gauge, slot fill, magnet strength, magnet thickness/width, and optimal relationship between the number of magnets to the number of coils.

The actuator assembly 16 includes a first magnetic assembly 32 disposed at or proximate to the force transmitter 18, or otherwise disposed in a fixed position relative to the force transmitter 18. The first magnetic assembly 32 may be disposed on the force transmitter 18 or embedded or otherwise disposed in the force transmitter 18. The first magnetic assembly 32 includes any number or configuration of magnets. In one example, the actuator assembly 16 is at least partially disposed in a control chamber 34 that is isolated from the bore 14. The control chamber 34 is, for example, incorporated as part of the housing 12.

The valve assembly 20 includes a flow tube or other valve actuator 22 and a biasing device 36 such as a power spring 36 that biases the valve actuator 22 toward a closed position in which the flow tube is moved away from the flapper valve 24 and allows the flapper valve 24 to rotate about a pivot point 38 and close the bore 14. A second magnetic assembly 40 is disposed at an end of the valve actuator 22 toward the actuator assembly 16, or is otherwise disposed in a fixed position relative to the valve actuator 22. The valve actuator 22 has an opposite end 42 that interacts with the flapper valve 24. The magnetic assemblies 32 and 40 form a magnetic coupling or otherwise interact to cause force to be transmitted between the force transmitter 18 and the valve actuator 22. The force transmitter 18 and the first magnetic assembly 32 thus may be physically isolated from the valve actuator 22 and the second magnetic assembly 40. For example, the force transmitter 18 and the valve actuator 22 are disposed in the control chamber 34 and the bore 14, respectively, which are isolated from one another. Thus, there is no physical connection between the force transmitter 18 and the valve actuator 22.

In one embodiment, the magnetic assemblies 32 and/or the magnet assemblies 40 are electromagnets disposed at the force transmitter 18 and the valve actuator 22, respectively. The electromagnets 32 and 40 are coupled to one or more power sources and optional control units. Utilizing electromagnets aids in provide a system that has improved failsafe properties, in that such a system effectively resets every time power is cycled on/off so there would not be a circumstance where the magnetic coupling or repelling was permanently out of alignment. Alternatively, the magnetic assemblies 32 and 40 are permanent magnets or a combination of permanent magnets and electromagnets.

The magnetic assemblies 32 and 40 may be configured so that they interact via an attractive and/or a repulsive force. The magnets 32 and 40 may be magnetically coupled so that movement between the force transmitter 18 and the valve actuator 22 are synchronized, such as by configuring the magnets 32 and 40 so that they attract each other.

In one embodiment, the first and second magnetic assemblies 32 and 40 are configured so that they exert a repelling force relative to one another. For example, the first and second magnetic assemblies 32 and 40 have the same polarity in an axial direction and thus create a repelling force relative to one another. In this configuration, the first magnetic assembly 32 is positioned in the control chamber 34, and as the force transmitter 18 moves toward the valve actuator 22, the first magnetic assembly 32 repels the second magnetic assembly 40 on the valve actuator 22, effectively driving the valve actuator 22 toward an open position in which the flow tube opens the flapper valve 24.

When the actuator assembly 16 is in a first (or closed) position, the force transmitter 18 is disposed away from the flow tube 22. The valve actuator 22 is independently movable relative to the force transmitter 18 as the force transmitter 18 is moved away from the valve actuator 22. The power spring 36 expands and pushes the valve actuator 22 away from the flapper valve 24. The flapper valve 24 thus pivots about the pivot point 38 by gravity, for example, and blocks the bore 14 to prevent the flow of downhole fluids therethrough.

When the actuator 16 is in a second (or open) position, the force transmitter 18 is disposed toward the valve actuator 22. As the first magnetic assembly 32 moves toward the valve actuator 22, the first magnetic assembly 32 repels the second magnetic assembly 40 and thereby forces the valve actuator 22 toward the valve 24. The opposite end 42 is thus in an advance position and acts to hold the flapper valve 24 open and against the housing 12. The valve actuator 22, in the open position, compresses the power spring 36 and rotates the flapper valve 24 out of the flowpath, allowing oil, gas and/or other fluids to flow through the bore 14.

The valve apparatus 10 may be incorporated into a downhole string or other component configured to be disposed downhole, such as a drillstring, a production string, a bottomhole assembly (BHA), a downhole tool or other carrier. Further, the valve apparatus 10 may be incorporated into a string segment such as a drillstring or production string segment. Each segment may have suitable connection mechanisms such as a threaded mechanism or a slip fit mechanism configured to connect the segment to an adjacent segment or other component. As described herein, "drillstring", "string" or "downhole carrier" refers to any structure or carrier suitable for lowering a tool or other component through a borehole or connecting a drill bit to the surface, and is not limited to the structure and configuration described herein.

Figure 2:
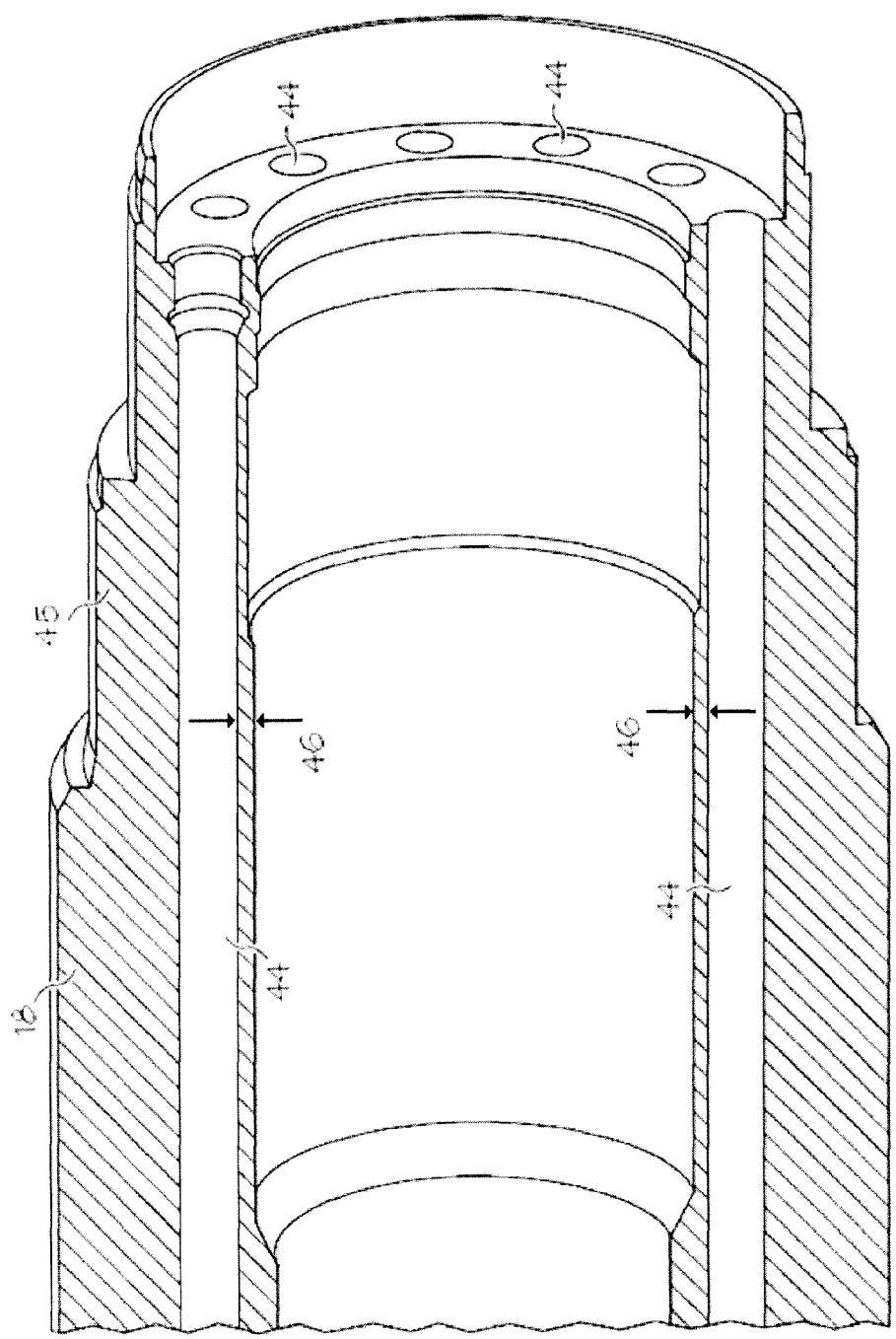
FIG. 2 is a perspective view of an exemplary force transmitter of the subsurface valve assembly of FIG. 1.

Referring to FIG. 2, in one embodiment, the force transmitter 18, the actuator assembly 16 and/or the control chamber 34 includes one or more axially elongated passageways or bores 44 configured to allow one or more magnetic assemblies 32 to be disposed therein. In one embodiment, the force transmitter 18, the actuator assembly 16 and/or the control chamber 34 includes a housing 45 having one or more passageways 44 that extend through at least a portion of a wall of the housing 45. An exemplary housing 45 is a tubular and/or annular body such as a cylinder or rod. In one example, the passageways 44 are a plurality of passageways 44 that are circumferentially arranged about a central axis of the force transmitter 18 and/or the housing 45. For example, the passageways 44 are arranged within the housing 45 wall symmetrically around the central axis.

The housing 45 may be incorporated as part of the force transmitter 18, the actuator assembly 16 and/or the control chamber 34. In one embodiment, the housing 45 is stationary relative to the force transmitter 18, and the one or more magnetic assemblies 32 are configured to be moved axially within the passageways 44 as the force transmitter 18 is moved axially. For example, the housing 45 is part of, attached to or otherwise disposed in a fixed position relative to the control chamber 34. In another embodiment, the housing 34 is disposed in a fixed position relative to the force transmitter 18 and/or the magnetic assemblies 32.

Each magnetic assembly 32 is configured, for example, to be disposed within a respective passageway 44. This configuration greatly reduces an air gap 46 between the magnetic assembly 32 and the magnetic assembly 40 or other magnets located at the valve assembly 20, by reducing the distance that the magnetic force must overcome. The outside diameter of the force transmitter 18 and the associated control chamber 34 can thus be significantly reduced. The magnetic assemblies 32 and 40 may be configured to be magnetically coupled or magnetically repelled.

The magnetic assembly 32 may be configured as one or more magnetic members 32. In one example, each of the one or more magnetic members 32 includes a selected number of small magnets mounted on or in an axially extending member such as a rod. In another example, each of the one or more magnetic members 32 is formed into axially extending members such as in the form of rods or rod segments. These configurations eliminate the need for large annular magnets that require an increased outside diameter of the force transmitter 18.

The passageways 44 may be drilled or otherwise formed in the wall of the housing 45, or formed or attached to the outer or interior surface of the wall of the housing 45. For example, the force transmitter 18 includes a plurality of bores 44 symmetrically arranged about a circumference of the housing 45.

Figure 3:
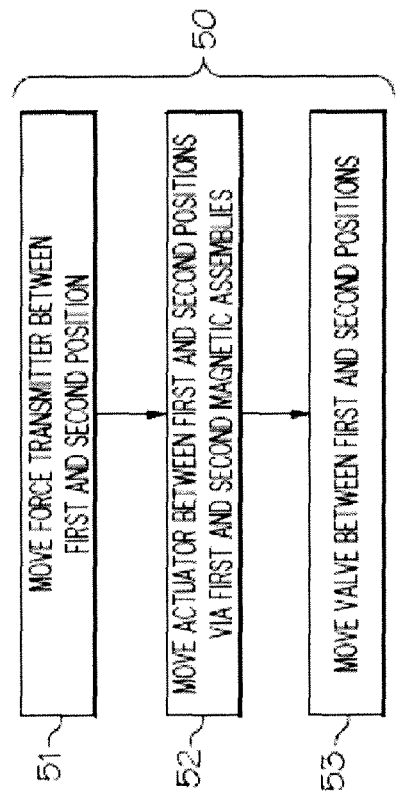
FIG. 3 is a flow chart illustrating an exemplary method of controlling fluid flow in a borehole string.

FIG. 3 illustrates a method 50 of controlling fluid flow in a borehole string or other downhole conduit. The method 50 includes one or more stages 51-53. The method may be used in conjunction with the valve apparatus 10, but may also be used with any suitable valve assembly utilizing a magnetic coupling or magnetic interaction. The method 50 may include the execution of all of stages 51-53 in the order described. However, certain stages may be omitted, stages may be added, or the order of the stages changed.

In the first stage 51, the linear motor or type of actuating mechanism is utilized to move the force transmitter 18 between a first position and a second position.

In one example, the first position is a closed position in which the force transmitter 18 is positioned axially away from the valve actuator 22. In the closed position, the valve actuator 22 is moveable independent of the force transmitter 18, as the first magnetic assembly 32 is not sufficiently close to the second magnetic assembly 40 to cause movement of the valve actuator 22. In one example, the biasing device 36 exerts a force on the valve actuator 22 away from the flapper valve 24 so that the actuator is positioned away from the flapper valve 24 and the flapper valve 24 can pivot into the bore 14 and block fluid flow.

The second position is an open position in which the force transmitter 18 is positioned axially toward the valve actuator 22. Although the first and second positions are described as closed positions and open positions, respectively, the valve apparatus 10 may be configured so that the first position is an open position and the second position is a closed position.

In the second stage 52, the first magnetic assembly 32 interacts with the second magnetic assembly 40 on the valve actuator 22 to cause the valve actuator 22 to move between the first and second position. The interaction between the first and second magnetic assemblies 32 and 40 is at least one of an attractive and repulsive force. The magnetic assemblies 32 and 40 may be magnetically coupled so that movement of the force transmitter 18 and the valve actuator 22 is synchronized.

In one embodiment, the first magnetic assembly 32 disposed at the force transmitter 18 exerts a repelling force on the second magnetic assembly 40 and, in turn, the valve actuator 22. Thus, a repelling force causes the valve actuator 22 to move axially toward the second position as the force transmitter 18 approaches a position that is sufficiently close to the valve actuator 22 so that the magnetic assemblies 32 and 40 repel each other. For example, as the force transmitter 18 moves axially toward the valve actuator 22, the repelling force between the magnetic assemblies 32 and 40 causes the valve actuator 22 to move toward the flapper valve 24. If the force transmitter 18 is moved axially away from the valve actuator 22, for example, the repelling force between the magnetic assemblies 32 and 40 lessens, allowing the biasing device 36 to force the valve actuator 22 toward the first position.

In the third stage 53, the valve actuator 22 causes the valve 24 to move between the first position and the second position. For example, as the valve actuator 22 moves toward the second position, it forces the flapper valve 24 to pivot out of the bore 14 and allow fluid flow therethrough. In one example, the repelling force is sufficient to overcome the biasing force of the biasing device 36.

The systems and methods described herein provide various advantages over existing processing methods and devices. For example, the valve apparatus described herein allows for isolating the control system of an electric safety valve without the need for dynamic seals. In addition, one of the benefits of using a repelling force as opposed to a magnetic coupling is that the repelling system would still be fail-safe if a flow tube were jarred with a heavy enough force to decouple a magnetic coupling. In a magnetic coupling arrangement, if the magnet is jarred with a higher load than the coupling force and becomes decoupled, the flow tube would not be able to travel to the full-closed position. This failure mode can be avoided by using magnets that are not coupled but relied upon a repelling force to open a safety valve, as described herein.

In addition, the use of one or more axially elongated magnetic members disposed on or in a force transmitter as described herein greatly reduces the air gap between magnets in a control chamber with magnets on a flow tube or other valve actuator, which allows for a smaller outer diameter of the force transmitter and associated control system, compared to prior art magnetic coupled systems. The smaller outer diameter may be achieved, for example, due to having a thinner wall thickness of the force transmitter near the first magnetic assembly while retaining the overall burst rating for the housing. One of the chief complaints of prior art magnetically coupled devices is the large outside diameter of a housing that is required to contain the magnets. The large outside diameter is a stipulation of the amount of wall thickness that is required to contain the pressure in the tubing trying to burst the housing. The configuration described herein overcomes this disadvantage. The axially elongated passageways and associated magnetic assemblies described herein may be positioned much closer to the inside diameter of the housing. Due to the small wall thickness between the magnets and the flow tube the magnetic force is maintained at a high level without requiring an overall large outside diameter on a downhole tool.

In connection with the teachings herein, various analyses and/or analytical components may be used, including digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention.

The invention claimed is:

1. A downhole valve apparatus comprising:
a force transmitter configured to move in an axial direction;
a valve actuator configured to move in an axial direction, the valve actuator independently movable relative to the force transmitter and physically isolated from the force transmitter;
a first magnetic assembly disposed at the force transmitter; and
a second magnetic assembly disposed at the valve actuator, the first and second magnetic assemblies configured to repel one another and cause the force transmitter to move the valve actuator when the force transmitter is moved toward the valve actuator.

2. The downhole valve apparatus of claim 1, wherein the first magnetic assembly is selected from at least one of: at least one permanent magnetic and at least one electromagnet.

3. The downhole valve apparatus of claim 1, wherein the second magnetic assembly is selected from at least one of: at least one permanent magnetic and at least one electromagnet.

4. The downhole valve apparatus of claim 1, further comprising a linear motor operably connected to the force transmitter.

5. The downhole valve apparatus of claim 1, wherein the valve actuator is operably connected to a downhole safety valve in communication with a downhole fluid conduit, the valve actuator and the downhole safety valve configured to move between an open position in which downhole fluid is allowed to flow through the conduit, and a closed position in which the downhole safety valve prevents the flow of downhole fluid through the conduit.

6. The downhole valve apparatus of claim 5, further comprising a biasing device configured to bias the valve actuator toward the closed position.

7. The downhole valve apparatus of claim 5, wherein the downhole safety valve is a flapper valve.

8. The downhole valve apparatus of claim 1, further comprising a housing including a production bore and a control chamber in fluid isolation from the production bore, the production bore configured to house the valve actuator and the control chamber configured to house the force transmitter.

9. The downhole valve apparatus of claim 1, wherein the force transmitter is axially movable independent of the valve actuator, and the valve actuator is independently movable when the force transmitter is in a first position away from the valve actuator.

10. The downhole valve apparatus of claim 9, wherein the valve actuator is moveable in response to a repelling force when the force transmitter is moved toward the valve actuator relative to the first position.

11. The downhole valve apparatus of claim 1, wherein the valve apparatus is a surface controlled subsurface safety valve ("SCSSV") apparatus.

12. A method of controlling fluid flow in a downhole conduit comprising:
moving a force transmitter in an axial direction, the force transmitter including a first magnetic assembly;
exerting a repulsive force on a second magnetic assembly disposed at a valve actuator, to cause the valve actuator to move in the axial direction, the valve actuator being independently movable relative to the force transmitter and physically isolated from the force transmitter; and
moving a valve between an open position in which downhole fluid is allowed to flow through a downhole conduit and a closed position in which the valve prevents the flow of downhole fluid through the conduit.

13. The method of claim 12, wherein the first magnetic assembly is selected from at least one of: at least one permanent magnetic and at least one electromagnet.

14. The method of claim 12, wherein the second magnetic assembly is selected from at least one of: at least one permanent magnetic and at least one electromagnet.

15. The method of claim 12, wherein the force transmitter is moved via a linear motor.

16. The method of claim 12, further comprising biasing the valve actuator toward a position in which the valve is in the closed position.

17. The method of claim 12, wherein the valve apparatus is a surface controlled subsurface safety valve ("SCSSV") apparatus.

18. The method of claim 12, wherein the valve is a flapper valve, and moving the valve includes pivoting the flapper valve about a pivot point.

19. The method of claim 12, wherein the downhole conduit includes a production bore and a control chamber in fluid isolation from the production bore, the production bore configured to house the valve actuator and the control chamber configured to house the force transmitter.

20. The method of claim 12, wherein the force transmitter is axially movable independent of the valve actuator, and the valve actuator is independently movable when the force transmitter in a first position away from the valve actuator.

* * * * *